April 25, 1967    J. B. LADNER ET AL    3,315,306
APPARATUS FOR THE PRODUCTION OF MULTILAYER FILM
Filed Oct. 15, 1965
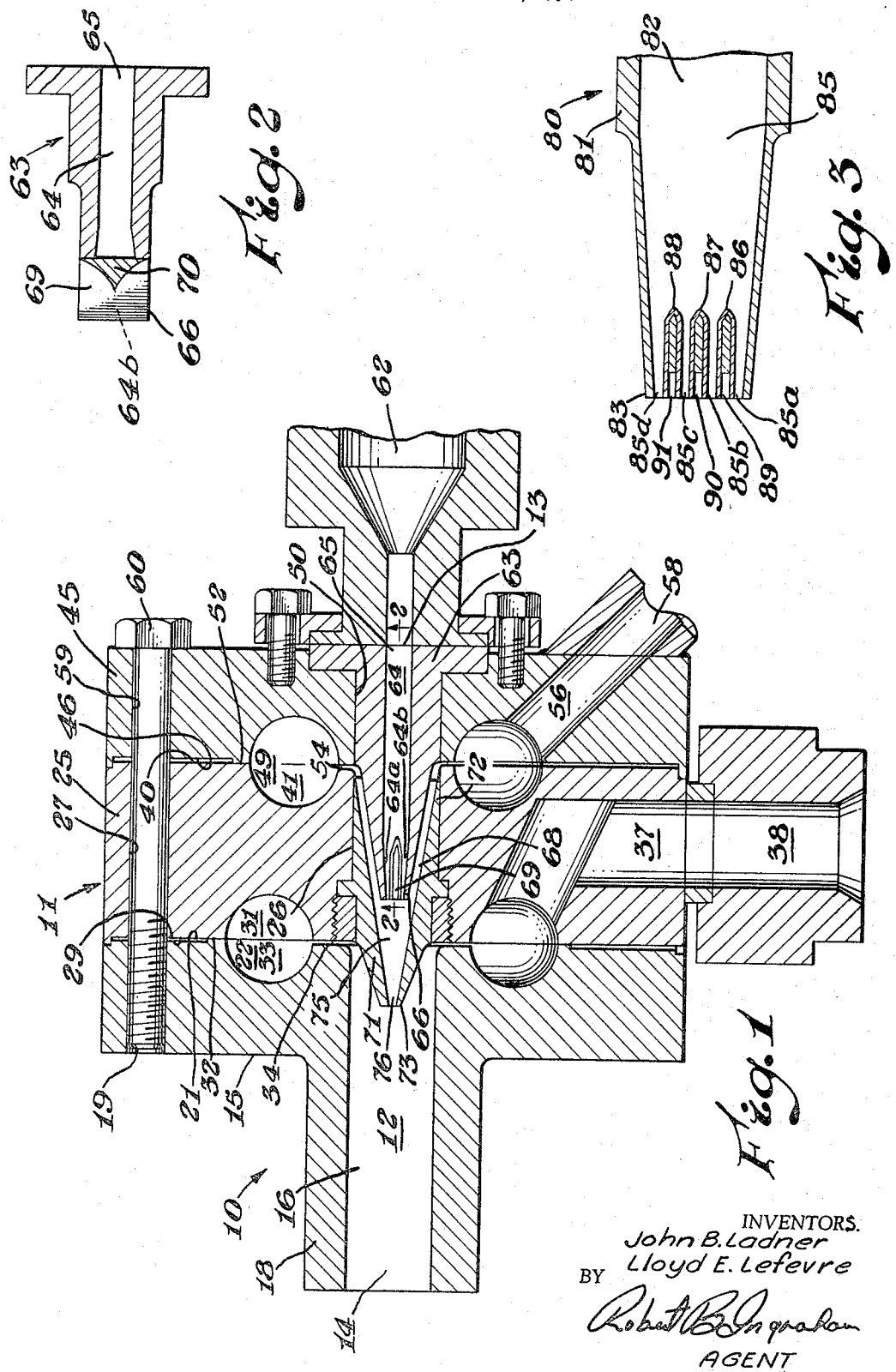
INVENTORS.
John B. Ladner
Lloyd E. Lefevre
BY
Robert B. Ingraham
AGENT United States Patent Office 3,315,306
Patented Apr. 25, 1967

3,315,306
APPARATUS FOR THE PRODUCTION OF
MULTILAYER FILM
John Basil Ladner, Beaverton, and Lloyd Edward Lefevre,
Bay City, Mich., assignors to The Dow Chemical Company, Midland, Mich., a corporation of Delaware
Filed Oct. 15, 1965, Ser. No. 496,551
3 Claims. (Cl. 18—13)

This invention relates to an apparatus for the preparation of multilayer film. It more particularly relates to an improved extrusion adaptor for producing a layered film having a greater number of layers than components fed to the extrusion adaptor.

The desirability of multilayer coextruded film has been set forth in British Patent 985,310 and Canadian Patent 713,477. Beneficially such multilayer film may be prepared by the simultaneous extrusion of two or more synthetic resinous thermoplastic streams within a die by providing a composite stream having generally coaxially disposed components and subsequently deforming the composite stream to a flat sheet-like configuration or to a tubular configuration and extruding the composite deformed stream from a desired die. Generally the number of layers within a film prepared from composite stream coextrusion is generally equal to $2n-1$, wherein $n$ is the number of components fed to an extrusion adaptor and disposed in generally coaxial relationship within the composite stream. By the term layer is meant the apparent number of layers in the product of the extrusion after it has been trimmed to width. For example, a two component stream has a center layer and a peripheral outer layer. On passing into a sheeting die such a stream is flattened so that the center layer extends almost the entire width of the extruded sheet and is encapsulated within an outer layer. Removal of the undesirable edge projection of the extruded sheet results in a three layer film or sheet wherein the outer layers correspond to the outer layer of the composite stream. Oftentimes it is desired to make or prepare the multilayer streams by extrusion.

It would be beneficial if there were available an extrusion adaptor which permitted the preparation of a film having a number of layers greater than $2n-1$ wherein $n$ is the number of feed ports or individual component inlets.

It would also be desirable if there were available an extrusion adaptor suitable to be interposed between streams of heat plasticized extrudable synthetic resinous materials which could be readily adapted to vary the number of layers in the extruded product.

These benefits and other advantages in accordance with the present invention are achieved in a housing, the housing defining a polymer passageway having an inlet and an outlet, the inlet adapted to communicate with a first source of heat plastified thermoplastic resinous material, the outlet adapted to communicate with a sheeting die, the housing defining an internal generally annular plenum disposed about the polymer passageway, the housing defining an internal annular extrusion orifice providing communication between the internal passageway and the annular plenum, the housing defining a polymer supply passageway in operative communication with the annular plenum, a bushing disposed within the polymer passageway, the bushing having an inlet of generally circular configuration and at least two outlets of generally elongated configuration, the outlets being disposed intermediate the annular extrusion orifice and the discharge end of the polymer passageway. A portion of the bushing which comprises the discharge end defining at least two generally spaced apart discharge members defining the outlets and providing communication between the inlet end of the passageway and the outlet end of the passageway, the bushing defining a transverse slot between the outlets and so constructed and arranged so as to permit flow of material from the annular extrusion orifice between the elongated outlets of the bushing.

Further features and advantages of the present invention become more apparent from the following specification when taken in connection with the drawing therein.

FIGURE 1 is a schematic sectional representation of an extrusion adaptor in accordance with the present invention.

FIGURE 2 is a sectional view of a bushing of FIGURE 1 taken along the line 2—2 thereof.

FIGURE 3 is a sectional view of a portion of an alternate embodiment of a bushing for the adaptor of FIGURE 1.

In FIGURE 1 there is illustrated a schematic sectional view of an adaptor in accordance with the invention generally designated by the reference numeral 10. The adaptor 10 comprises a housing 11 having defined therein a generally centrally located passageway 12 having an inlet end 13 and an outlet end 14. The housing 11 comprises a first body portion 15. The body portion 15 has defined therein a generally centrally disposed passageway 16 which forms a portion of the passageway 12. The body portion 15 defines a boss 18 adapted to engage a sheeting die or connected to supply a sheeting die, not shown. The body portion 15 defines a plurality of internally threaded apertures generally peripherally disposed about the first body portion 15 and generally parallel to the axis of the passageway 12. The body portion 15 defines an external face 21 generally radially outwardly extending from the internal passageway 16. The face 21 is generally remotely disposed from the boss 18. An annular recess 22 is defined within the face 21 and is generally coaxially disposed about the passageway 16. A second body portion 25 is disposed generally adjacent the body portion 15. The body portion 25 defines an internal passageway 26 which forms a portion of the passageway 12. The body portion 25 defines a plurality of generally cylindrical apertures 27 adapted to mate with the internally threaded apertures 19 of the first body portion 15. The second body portion 25 has a generally radially outwardly extending face 29 and is disposed adjacent the face 21 of the first body portion 15. The face 29 has defined therein a generally annular recess 31 adapted to mate with the annular recess 22 to define a generally toroidal plenum 33. The faces 21 and 29 are in sealing engagement at a location 32 remote from a central passageway 12. The surfaces 21 and 29 define a generally annular extrusion orifice 34 providing communication between the passageway 12 and the plenum 33. The body portion 25 defines a polymer inlet passageway 37 which provides communication between the plenum 33 and a source of heat plastified extrudable material 38. The second body portion 25 defines a radially outwardly extending surface 40 remotely disposed from the surface 29. The surface 40 has defined therein a generally annular passage or groove 41. A third body portion 45 is disposed generally adjacent the second body portion 25 and remote from the first body portion 15. The third body portion 45 defines a generally radially outwardly extending surface 46 having defined therein a generally annular groove adapted to mate with the groove 41 of the second body portion 25 and defines a generally toroidal plenum 49 generally centrally disposed about the passageway 12. The body portion 45 defines a generally centrally disposed passageway 50 which forms a portion of the passageway 12. The faces 40 and 46 are in sealing engagement at a location 52 adjacent the annular plenum 49 and remotely disposed from the passageway 50. The surfaces 40 and 46 define a generally annular inwardly facing extrusion passage 54 providing communication between the annular plenum 49 and the central passageway 12. The body portion 45 defines a third polymer passageway 56 providing full communication between the annular plenum 49 and a third source of heat plastified material 58. The body portion 45 defines a plurality of peripherally disposed apertures 59 arranged to coincide with the apertures 27 of the second body portion 25 in the internally threaded apertures 19 of the first body portion 15. A plurality of bolts 60 pass through the apertures 59 and 27 and engage the internally threaded apertures 19 to secure the various body portions in fixed relationship to each other. A first polymer source 62 is rigidly affixed to the third body portion 45 and provides communication with the inlet end 13 of the passageway 12. A first bushing 63 is disposed within the inlet end 13 of the passageway 12. The bushing 63 defines an internal passageway 64 providing communication between the polymer source 62 and the outlet end 14. The passageway 64 has a first end 65 and a second end 66. The internal configuration of the first end 65 of the passageway 66 is generally circular whereas the configuration of the discharge or discharge end 66 is generally rectangular. The bushing 63 adjacent the second end 66 of the passageway 64 defines an external surface 68 of a generally tapering configuration. A slot 69 is defined by the bushing 63 adjacent the second end 66 of the passageway 64 and divides the passageway 64 into a first passage portion 64a and a second passage portion 64b. The passageways 64a and 64b each terminate in a generally rectangular slot or opening remote from the first opening or passage 64. The bushing 63 in defining the slot 69 provides a generally streamline configuration for the slot and has a configuration generally commensurate with the terminal passageway portions 64a and 64b.

In FIGURE 2 there is depicted a sectional view of the bushing 63 taken along the line 2—2 of FIGURE 1, which clearly illustrates the relative positions of the first end 65 and a second end 66 illustrating a configuration of at least a portion of the bushing 63 defining the slot 69. The passageway 64b is disposed immediately beneath the slot 69. A bushing portion 70 defines a streamline outer configuration to permit entrance of thermoplastic resinous material in heat plastified condition into the slot 69. A bushing 71 is disposed within the body portion 25 generally adjacent the annular extrusion orifice. The bushing 71 has a first end 72 and a second or exit end 73. The exit end 73 is disposed between the discharge end 14 of the passageway 12 and the annular passageway 34. The bushing 71 defines an internal longitudinal passageway 75 which provides communication between the first end 72 and the second end 73. The internal configuration of the passageway 75 adjacent the first end 72 is generally circular, whereas the passageway 75 adjacent the second end 73 terminates in a generally elongated or rectangular extrusion orifice 76. The major axis of the elongate axis of 76 is generally coplanar with the major axis of the elongate openings of the second end 66 of the bushing 63.

In operation of the embodiment illustrated in FIGURES 1 and 2, heat plastified synthetic resinous material from the first polymer source 62 is passed into the passageway 64 of the bushing 63 where it is divided into two streams in the channel and/or passageway portions 64a or 64b, and the streams discharged from the second end 66 of the bushing 63. A third stream of synthetic resinous heat plastified polymeric material is supplied from the third source 58 through the passageway 56 into the plenum 49. From there it is subsequently passed through the annular extrusion orifice 54 into the passageway 12 and flows about the portion of the bushing 63 lying between the annular orifice 54 and the discharge end 14 of the passageway 12. The material from the third polymer source flows into the slot 69 and discharges between the streams emerging from the passageway portions 64a and 64b, resulting in a composite stream which has a matrix of the material from the third polymer source 58 encapsulating two generally parallel ribbons of the material from the first polymer source. The composite stream from the bushing 63 and the third polymer source flows within the passageway 75 and is discharged in a generally rectangular configuration from the elongate opening 76 of the passage 75. Heat plastified thermoplastic material from the source 38 passes in from the passageway 37 into the generally toroidal plenum 33. The material from the plenum 33 is then passed through the generally annular extrusion orifice 34 and encapsulates the material emerging from the passageway 76 to form a composite stream within the discharge portion 14 of the passageway 12, which comprises two separate layers of the material from the first polymer source 62 encapsulated within a generally rectangular matrix of material from the third polymer source 58 which in turn is encapsulated within a generally cylindrical stream of material from the second polymer source 38. Subsequently the composite stream is passed to a sheeting die having the extrusion orifice oriented in a plane which contains the major axis of the cross-sectional configuration of the inner stream formed by the opening 76. The composite stream is subsequently deformed to provide a multilayer film, employing the apparatus of FIGURES 1 and 2 and three different feed sources, the resultant flat composite sheet has first and second surface layers formed of the material from the plenum 33. A central layer and two inner layers formed from the material of the plenum 49 and two layers adjacent the center layer of material from the first polymer source 62.

In FIGURE 3 there is illustrated a cut away view of an alternate bushing in accordance with the present invention generally designated by the reference numeral 80. The bushing 80 comprises a body portion 81 having an entrance end 82 and an exit end 83. The bushing body 80 defines an internal tapering passageway 85 which is of generally circular configuration adjacent the first end 82 and has a generally rectangular cross-sectional configuration adjacent the second end 83. A plurality of stream dividers 86, 87 and 88 are transversely disposed within the second end 83 of the passageway 85. The stream dividers 86, 87 and 88 divide the passageway 85 into subpassageways 85a, 85b, 85c and 85d. Each of the subpassageways terminate at the second end 83 of the bushing 80 in a generally rectangular or elongate exit orifice. The stream dividers 86, 87 and 88 define slots 89, 90 and 91, respectively, which are of a generally streamline configuration and so constructed and arranged so as to permit the flow of a material from the outer surface of the bushing 80 into the slots or passages 89, 90 and 91 and be disposed intermediate the flow from the openings 85a, 85b, 85c and 85d.

Thus as is already apparent the extrusion adaptors of the present invention are readily employed to prepare layered or laminate film and streams of widely varying configuration. The number of layers being primarily dependent upon the type and variety of bushing installed within the passageway 12. For example, in FIGURE 1 the bushing 63 and the bushing 71 are both readily replaced with a bushing of the nature of bushing 80 to provide a stream having many layers. Alternately the bushing 63 is readily replaced with a bushing having the general discharge configuration of the bushing 71, and the bushing 71 replaced with a bushing which has the discharge configuration of the bushing 80.

Thus multilayer film of almost any desired configuration is prepared. If desired the multilayer film can be prepared utilizing an adaptor substantially as shown in FIGURE 1 and utilizing one or more generally toroidal plenums disposed about a bushing having a multiplicity of exit orifices and slots or passageways which permit the encapsulation of material flowing through the bushing.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention excepting as it is set forth and defined in the hereto appended claims.

What is claimed is:

1. An extrusion adaptor particularly suited to be interposed between at least two sources of heat plastified synthetic resinous thermoplastic material and a sheeting die, the adaptor comprising a housing defining a polymer passageway having an inlet and an outlet, the inlet adapted to communicate with a first source of heat plastified thermoplastic resinous material, the outlet adapted to communicate with a sheeting die, the housing defining an internal generally annular plenum disposed about the polymer passageway, the housing defining an internal annular extrusion orifice providing communication between the polymer passageway and the annular plenum, the housing defining a polymer supply passageway in operative communication with the plenum, a bushing disposed within the polymer passageway, the bushing having an inlet of generally circular configuration and at least two outlets of generally elongate configuration, the outlets being disposed intermediate the annular extrusion orifice and the outlet of the polymer passageway, a portion of the bushing, which comprises a discharge end, defining at least two generally spaced apart discharge members defining the outlets and providing communication between the inlet end of the passageway and the outlet end of the passageway, the bushing defining a transverse slot between the outlets and so constructed and arranged so as to permit flow of material from the annular extrusion orifice between elongate outlets of the bushing.

2. The apparatus of claim 1 wherein the bushing defines a plurality of outlets and a plurality of transverse slots between the outlets.

3. The apparatus of claim 1 wherein at least 2 annnular plenums are defined by the housing and each of the plenums communicates with the polymer passageway by means of an internal annular extrusion orifice.

References Cited by the Examiner

UNITED STATES PATENTS

| | | | |
|---|---|---|---|
| 1,397,571 | 11/1921 | Bowen. | |
| 2,047,395 | 7/1936 | Stelkens | 18—12 |
| 2,820,249 | 1/1958 | Colombo | 18—13 |
| 3,121,255 | 2/1964 | Henning et al. | 18—13 |
| 3,189,941 | 6/1965 | Reifenhauser | 18—13 |
| 3,227,103 | 1/1966 | Schafer | 18—13 X |
| 3,241,503 | 3/1966 | Schafer | 18—13 X |

FOREIGN PATENTS 520,637    6/1953    Belgium.

WILLIAM J. STEPHENSON, *Primary Examiner.*